Patented Oct. 11, 1938

2,132,871

UNITED STATES PATENT OFFICE 2,132,871

HYDROLYSIS OF MIXED ESTERS OF CELLULOSE

Carl J. Malm and Loring W. Blanchard, Jr., Rochester, N. Y., assignors to Eastman Kodak Company, Rochester, N. Y., a corporation of New Jersey No Drawing. Application January 22, 1938, Serial No. 186,469

6 Claims. (Cl. 260—102)

The present invention relates to the hydrolysis of mixed organic acid esters of cellulose containing at least 25% of fatty acid groups of more than 10 carbon atoms in a bath containing chloracetic acid and 10–25% of water.

In previous instances in which mixed esters having a substantial content of higher acyl groups have been hydrolyzed only amounts of water on the order of 5% could be tolerated and consequently the hydrolysis reaction proceeded slowly and sometimes unevenly. Due to the small amount of water the cellulose ester has been susceptible to some degrading action, depending as to degree on the temperature and the amount of catalyst employed.

One object of our invention is to provide a hydrolysis process in which the reaction occurs smoothly but without danger of degrading the cellulose ester. Another object of our invention is to provide a hydrolysis process which is susceptible to speeding up by the use of a substantial amount of catalyst and a higher temperature than was formerly thought to be safe in treating a cellulose ester. Other objects of our invention will appear herein.

We have found that if a mixed ester of cellulose containing at least 25% of fatty acid groups of more than 10 carbon atoms is hydrolyzed in a bath containing chloracetic acid as the predominating solvent the hydrolysis mixture will tolerate up to 25% of water without causing precipitation of the cellulose ester. In such a process the increased proportion of water buffers the degrading action from the use of substantial amounts of catalyst and from elevated temperatures, and instead of slowing down the reaction the increased amount of water increases the rate of hydrolysis. The larger amount of catalyst and higher temperature also increases the rate of hydrolysis so that the time necessary to obtain a partially hydrolyzed mixed ester containing a large amount of higher acyl is much less than has been formerly necessary. This results in less tying up of apparatus in which the hydrolysis is carried out. Also, there is no danger of degrading the cellulose ester unless greatly excessive amounts of catalyst or greatly excessive temperatures are employed.

Some of the esters which may be hydrolyzed in accordance with our invention are cellulose acetate stearate, cellulose acetate palmitate, cellulose acetate margarate, cellulose acetate laurate, and other like esters containing large proportions of higher fatty acid groups. The chloracetic acid which is present as the solvent for the hydrolysis process may be that which was employed in the esterification mixture or the ester may have been dissolved in the chloracetic acid especially for the purpose of hydrolyzing it. In the former case the ester will be hydrolyzed while it is still in solution in the esterification mixture, the hydrolysis being induced by adding dilute chloracetic acid thereto so as to destroy the residual anhydride present and also to provide enough water to constitute more than 10% of the liquid present. If the proportion of liquid is large with respect to the ester, it may be necessary to add a very dilute chloracetic acid such as of 30% or even 20% concentration. In that case considerable care must be exercised in adding the dilute chloracetic acid to avoid precipitation of the ester. In most instances, however, a more concentrated chloracetic acid such as of 50% concentration may be added. If desired further aqueous chloracetic acid may be added as the hydrolysis proceeds so as to increase the water content of the hydrolysis bath over the course of the hydrolysis. As the ester is hydrolyzed it becomes more tolerant of a high water content so that an amount of water, even more than 25% of the total bath, may be incorporated over the course of the entire hydrolysis. The proportion of sulphuric acid which is employed to catalyze the hydrolysis reaction may be only 3% to 10% to give a satisfactory hydrolysis process. Nevertheless as much sulphuric acid as 15% or even 20%—the proportion being based on the amount of cellulose ester—may be employed, particularly if the high proportions of water are present so that the action of the sulphuric acid is buffered. It is preferred to carry out the hydrolysis at a temperature in the vicinity of 100° F. unless the proportion of sulphuric acid which is present is so small that a higher temperature is necessary to speed up the reaction. As pointed out above, with the larger amount of water which is present a higher temperature can be used without detrimentally affecting the cellulose. In cases where the larger proportions of sulphuric acid are employed a hydrolysis temperature as low as 70° F. may be found to be quite satisfactory.

To give the best results it is preferred that substantially all of the solvent present be chloracetic acid. Such a mixture would result from the preparation of a cellulose ester such as cellulose acetate stearate, for instance, in which chloracetic anhydride was used as the impeller and chloracetic acid as the solvent in the esterification reaction and the water was subsequently added by means of aqueous chloracetic acid. If, however, other solvents such as methoxyethyl acetate are present, it is desirable that the chloracetic acid constitute at least 60% of the solvent which is present.

After the hydrolysis is completed the cellulose ester may be separated out by precipitating the mass in very dilute acid or even in water or methyl alcohol. If chloracetic acid is the only solvent which is present and the precipitation is to be carried out by pouring the mass into a dilute acid, the use of aqueous chloracetic acid as the precipitant facilitates the recovery of the precipitating liquid after separating the cellulose ester therefrom.

The following example embodies our invention:

Five pounds of cellulose acetate having an acetyl content of 38% was added to a mixture of 12 pounds of chloracetic acid, 3.2 pounds stearic acid, 5 pounds of chloracetic anhydride, and 2.5 grams of p-toluene sulfonic acid. The mass was maintained at a temperature of 145° F. until a sample showed that the cellulose ester was soluble in hot toluene. The mass was then cooled to 100° F. and 6 parts of 50% chloracetic acid containing 40 c. c. of sulphuric acid was added thereto. The hydrolysis was carried out by maintaining the mass at 100° F. Samples were precipitated at various periods of the hydrolysis and tested for acetyl and stearyl content, the results being as listed:

| Hydrolysis | Acetyl | Stearyl |
|---|---|---|
| Hours: | Percent | Percent |
| Original | 26.5 | 31.3 |
| 24 | 25.4 | 30.7 |
| 48 | 22 | 29.5 |
| 96 | 20.5 | 26.3 |
| 144 | 20.0 | 23.4 |

Instead of acetyl other lower fatty acid groups such as propionyl or butyryl may be present in the cellulose ester which is hydrolyzed.

We claim:

1. The process of hydrolyzing a mixed organic acid ester of cellulose containing at least 25% of fatty acid groups of more than 10 carbon atoms which comprises treating the ester in a hydrolyzing bath in which the solvent essentially consists of chloracetic acid, the aggregate water content of the bath being 10–25%.

2. The process of hydrolyzing a cellulose acetate-stearate containing at least 25% of stearyl groups which comprises treating the ester in a hydrolyzing bath in which the solvent essentially consists of chloracetic acid, the aggregate water content of the bath being 10–25%.

3. The process of hydrolyzing a cellulose acetate laurate containing at least 25% of lauryl groups which comprises treating the ester in a hydrolyzing bath in which the solvent essentially consists of chloracetic acid, the aggregate water content of the bath being 10–25%.

4. The process of preparing a hydrolyzed mixed organic acid ester of cellulose containing at least 25% of fatty acid groups of more than 10 carbon atoms which comprises esterifying a lower fatty acid ester of cellulose containing free and esterifiable hydroxyl groups with an esterifying bath comprising a fatty acid of more than 10 carbon atoms, chloracetic anhydride, chloracetic acid and an acylation catalyst and subsequently adding sufficient aqueous chloracetic acid thereto to establish hydrolyzing conditions and maintaining the mass at a hydrolyzing temperature until the desired product is obtained.

5. The process of preparing a hydrolyzed mixed organic acid ester of cellulose containing at least 25% of fatty acid groups of more than 10 carbon atoms which comprises esterifying a cellulose acetate containing free and esterifiable hydroxyl groups with an esterifying bath comprising a fatty acid of more than 10 carbon atoms, chloracetic anhydride, chloracetic acid and an acylation catalyst and subsequently adding sufficient aqueous chloracetic acid thereto to establish hydrolyzing conditions and maintaining the mass at a hydrolyzing temperature until the desired product is obtained.

6. The process of preparing a hydrolyzed mixed organic acid ester of cellulose containing at least 25% of fatty acid groups of more than 10 carbon atoms which comprises esterifying a lower fatty acid ester of cellulose containing free and esterifiable hydroxyl groups with an esterifying bath comprising a fatty acid of more than 10 carbon atoms, chloracetic anhydride, chloracetic acid and an acylation catalyst and subsequently adding sufficient aqueous chloracetic acid to assure the presence of an aggregate water content of 10%–25% and maintaining the mass at a hydrolyzing temperature until the desired product is obtained.

CARL J. MALM.
LORING W. BLANCHARD, Jr.